(12) United States Patent
Zhang et al.

(10) Patent No.: US 10,178,656 B2
(45) Date of Patent: Jan. 8, 2019

(54) UPLINK TRANSMISSIONS IN AN UNLICENSED SPECTRUM

(71) Applicant: QUALCOMM Incorporated, San Diego, CA (US)

(72) Inventors: Xiaoxia Zhang, San Diego, CA (US); Tao Luo, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/964,323

(22) Filed: Dec. 9, 2015

(65) Prior Publication Data

US 2016/0174215 A1 Jun. 16, 2016

Related U.S. Application Data

(60) Provisional application No. 62/090,848, filed on Dec. 11, 2014.

(51) Int. Cl.
*H04W 72/04* (2009.01)
*H04L 5/00* (2006.01)
*H04W 72/14* (2009.01)
*H04W 74/08* (2009.01)
(Continued)

(52) U.S. Cl.
CPC ....... *H04W 72/0413* (2013.01); *H04L 5/0053* (2013.01); *H04L 5/0073* (2013.01); *H04W 72/0446* (2013.01); *H04W 72/14* (2013.01); *H04W 74/0808* (2013.01); *H04L 5/001* (2013.01); *H04L 5/0035* (2013.01); *H04W 74/02* (2013.01); *H04W 88/02* (2013.01)

(58) Field of Classification Search
CPC ......... H04W 72/0413; H04W 72/0446; H04W 72/14; H04W 74/0808; H04W 74/02; H04W 88/02; H04L 5/0053; H04L 5/0073; H04L 5/001; H04L 5/0035
USPC .......................................... 370/329
See application file for complete search history.

(56) References Cited

U.S. PATENT DOCUMENTS

2004/0086027 A1* 5/2004 Shattil ............... H04L 25/03834
375/146
2009/0141736 A1 6/2009 Becker
(Continued)

OTHER PUBLICATIONS

International Search Report and Written Opinion—PCT/US2015/064962—ISA/EPO—dated Mar. 4, 2016. 12 pages.

*Primary Examiner* — Chi Tang P Cheng
(74) *Attorney, Agent, or Firm* — Arent Fox, LLP

(57) ABSTRACT

A method and apparatus for uplink transmission by a user equipment (UE) includes receiving an uplink grant for data transmission in a subframe on an uplink channel, wherein the uplink grant includes an assignment to a resource block. The UE determines a resource block for sending a channel usage beacon signal (CUBS) over a contention-based spectrum based on the assignment included in the uplink grant. The CUBS reserves the uplink channel for the data transmission by indicating that the UE is sending the data transmission in a later subframe according to the assignment. The UE transmits the CUBS in a preceding subframe on the resource block in response to performing a successful clear channel assessment on the uplink channel, the preceding subframe directly preceding the subframe for the uplink data transmission.

30 Claims, 11 Drawing Sheets

(51) Int. Cl.
*H04W 88/02* (2009.01)
*H04W 74/02* (2009.01)

(56) References Cited

U.S. PATENT DOCUMENTS

| | | | |
|---|---|---|---|
| 2013/0136040 A1* | 5/2013 | Madaiah | H04W 72/0406 370/280 |
| 2014/0112289 A1* | 4/2014 | Kim | H04W 16/14 370/329 |
| 2014/0341207 A1 | 11/2014 | Bhushan et al. | |
| 2015/0172017 A1* | 6/2015 | Wu | H04L 5/001 370/329 |
| 2016/0183296 A1* | 6/2016 | Yerramalli | H04W 16/14 370/329 |

* cited by examiner

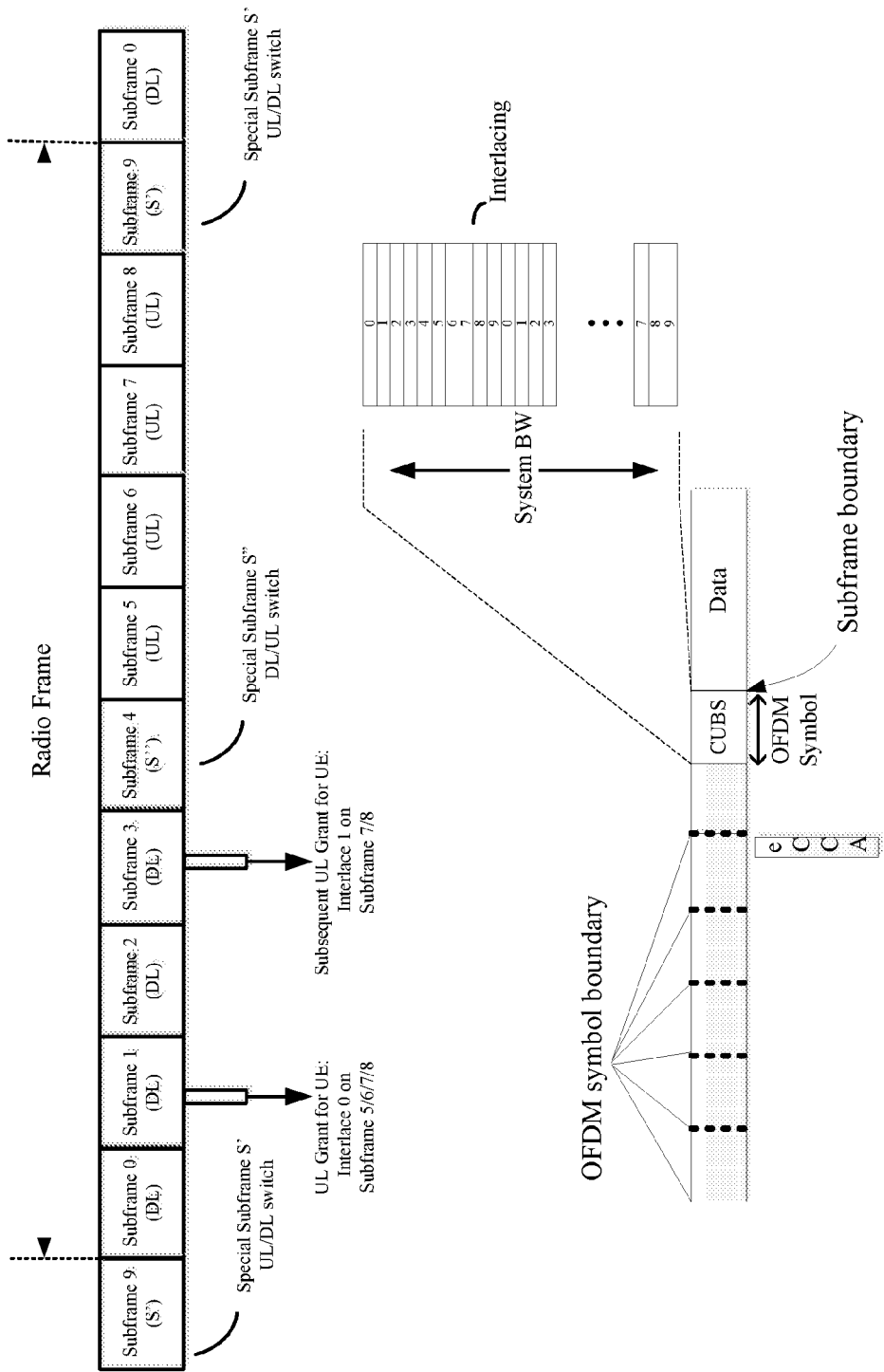

UPLINK TRANSMISSIONS IN AN UNLICENSED SPECTRUM

CLAIM OF PRIORITY UNDER 35 U.S.C. § 120

The present Application claims priority to Provisional Application No. 62/090,848 entitled "UPLINK TRANSMISSION IN UNLICENSED SPECTRUM," and filed Dec. 11, 2014, which is assigned to the assignee hereof and hereby expressly incorporated by reference herein.

BACKGROUND

Aspects of this disclosure relate generally to telecommunications, and more particularly to uplink transmissions in an unlicensed or shared spectrum.

Long Term Evolution (LTE) networks are expanding operation in the unlicensed or shared radio frequency (RF) bands for data offload. For example, using carrier aggregation features, LTE networks can operate at higher data rates while using both licensed and unlicensed RF bands. A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

A wireless terminal device (also referred to as user equipment or access terminal) that needs to transmit on an unlicensed or shared RF band may also be required to perform a clear channel assessment (CCA) each time before sending an uplink transmission. For example, a device may perform CCA/eCCA to determine whether a channel is clear for transmission. Generally, the CCA procedures may involve monitoring a channel for a CCA duration or time slot, for example 20 microsecond (μs). If the time slot is clear (e.g., the communications medium is available or accessible), the device may begin using the channel. When a channel is not clear, the device may initialize a random backoff counter for the channel. Each time the device detects a clear time slot, the random backoff counter is decremented. When the random backoff counter reaches 0, the device may transmit for a limited transmission opportunity. The duration of the transmission opportunity may be a multiple of the CCA time slot duration. During the transmission opportunity, other devices would be blocked by the transmission from also transmitting using the same channel.

Methods are needed to provide efficient and improved uplink transmissions among multiple access terminals associated with the same access point, in particular, when such access terminals are contending for access on the uplink channels. For example, it may be desirable to minimize interference at a UE with uplink transmissions caused by another UE's uplink transmissions. One such cause could be a UE sending a beacon signal in advance of the data transmission when reserving the uplink channel. While the network can use uplink grants to UEs to control scheduling of uplink resource blocks to avoid collisions of data transmissions, the network cannot control a UE from sending a reservation beacon signal in an uplink transmission that may happen to interfere with the uplink data transmission by another UE as assigned by an uplink grant.

SUMMARY

Systems and methods for resource block assignment for wireless devices operating in unlicensed or shared spectrum are disclosed.

In an aspect, the disclosure provides a method for uplink transmission by a user equipment. The method may include receiving an uplink grant for data transmission in a subframe on an uplink channel, the uplink grant including an assignment to a resource block. The method may further include determining a resource block for sending a channel usage beacon signal (CUBS) over a contention-based spectrum based on the assignment included in the uplink grant, wherein the CUBS reserves the uplink channel for the data transmission and indicates that the data transmission will follow in a later subframe according to the assignment. The method may further include transmitting the CUBS in a preceding subframe on the resource block in response to a successful clear channel assessment on the uplink channel, wherein the preceding subframe directly precedes the subframe for the uplink data transmission.

In an aspect, the disclosure provides an apparatus for uplink transmission on a subframe of interlaced resource blocks. The apparatus may include a processor and a memory coupled to the processor. In some aspects the memory may include instructions executable by the processor to receive an uplink grant for data transmission in a subframe on an uplink channel, the uplink grant including an assignment to a resource block. The instructions may further be executable by the processor to determine a resource block for sending a channel usage beacon signal (CUBS) over a contention-based spectrum based on the assignment included in the uplink grant, wherein the CUBS reserves the uplink channel for the data transmission by indicating that the UE is sending the data transmission in a later subframe according to the assignment. The apparatus may further include a transmitter configured to transmit the CUBS in a preceding subframe on the resource block in response to performing a successful clear channel assessment on the uplink channel, the preceding subframe directly preceding the subframe for the uplink data transmission.

Additionally or alternatively, aspects of the present disclosure may further include another apparatus for uplink transmission on a subframe of interlaced resource blocks. The apparatus may include means for receiving an uplink grant for data transmission in a subframe on an uplink channel, wherein the uplink grant includes an assignment to a resource block. The apparatus may further include means for determining a resource block for sending a channel usage beacon signal (CUBS) over a contention-based spectrum based on the assignment included in the uplink grant, wherein the CUBS reserves the uplink channel for the data transmission by indicating that the UE is sending the data transmission in a later subframe according to the assignment. In yet further examples, the apparatus may include means for transmitting the CUBS in a preceding subframe on the resource block in response to performing a successful clear channel assessment on the uplink channel, wherein the preceding subframe directly precedes the subframe for the data transmission.

These and other aspects of the invention will become more fully understood upon a review of the detailed description, which follows.

BRIEF DESCRIPTION OF THE DRAWINGS

The accompanying drawings are presented to aid in the description of various aspects of the disclosure and are provided solely for illustration of the aspects and not limitation thereof.

FIG. 3A is a diagram illustrating an example radio frame configuration having uplink and downlink subframes.

FIG. 3B is a diagram illustrating an example subframe structure including symbols and interlaced resource blocks available for sending uplink transmissions.

DETAILED DESCRIPTION

The disclosure relates in some aspects to uplink transmissions in an unlicensed or shared spectrum. Therefore, in aspects of the disclosure, methods and apparatus are described in which a user equipment (UE) receives an uplink grant for data transmission in a subframe on an uplink channel. The uplink grant includes an assignment to a resource block. The UE is further configured to determine a resource block for sending a channel usage beacon signal (CUBS) over a contention-based spectrum based on the assignment included in the uplink grant. The CUBS reserves the uplink channel for the data transmission by indicating that the UE is sending the data transmission in a later subframe according to the assignment. The UE is further configured to transmit the CUBS in a preceding subframe on the resource block in response to performing a successful clear channel assessment on the uplink channel, with the preceding subframe directly preceding the subframe for the uplink data transmission.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
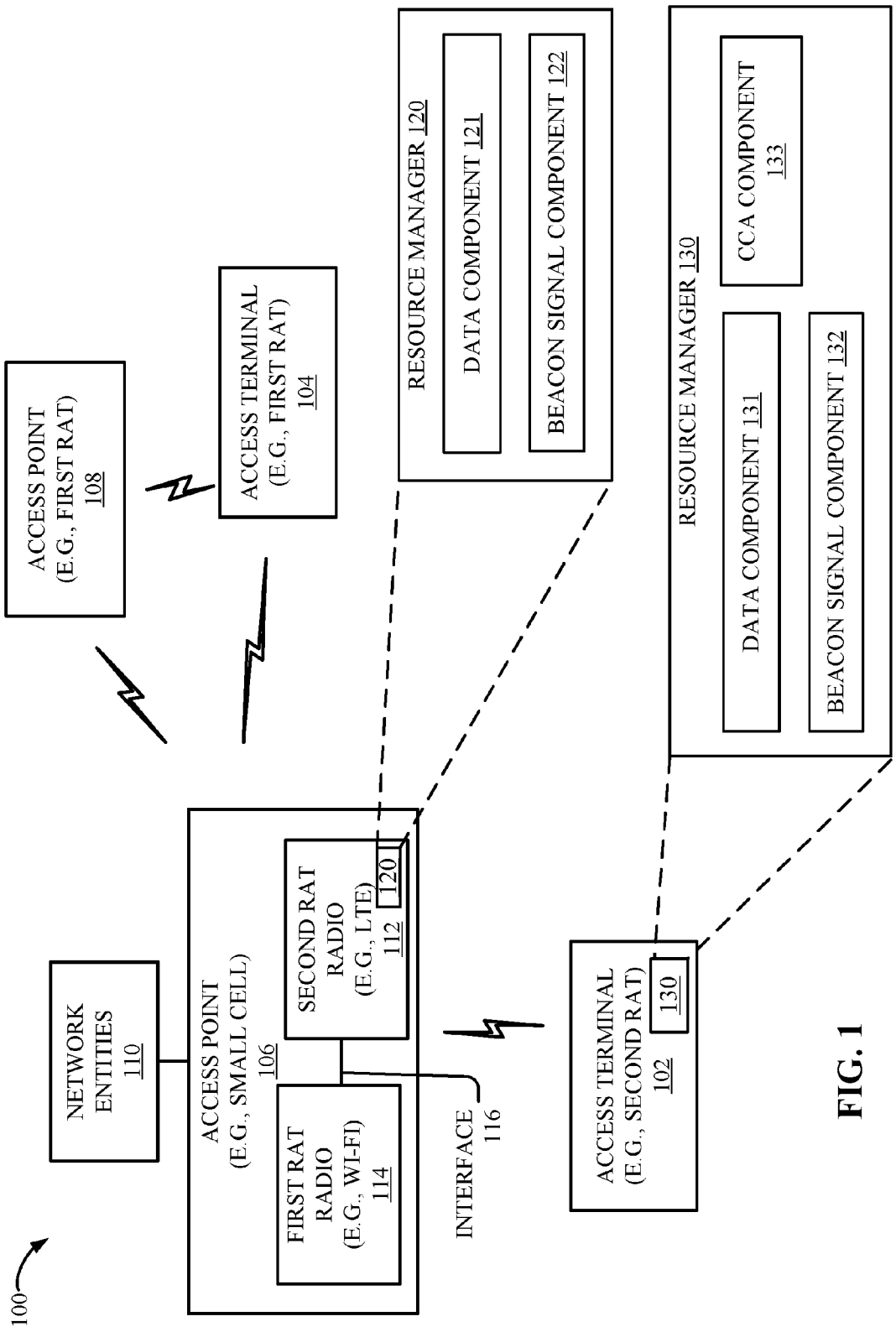
FIG. 1 is a simplified block diagram of several sample aspects of a communication system.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points (e.g., access points 106 or 108) in the system 100 provide access to one or more services (e.g., network connectivity) for one or more wireless terminals (e.g., the access terminal 102 or the access terminal 104) that may be installed within or that may roam throughout a coverage area of the system 100. For example, at various points in time the access terminal 102 may connect to the access point 106 or some other access point in the system 100 (not shown). Similarly, the access terminal 104 may connect to the access point 108 or some other access point.

One or more of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations, the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

Access point 106, for example, may include a first radio access technology (RAT) radio 114 and a second RAT radio 112. When the access point 106 (or any other devices in the system 100) uses a first RAT to communicate on a given resource, this communication may be subjected to interference from nearby devices (e.g., the access point 108 and/or the access terminal 102) that use a second RAT to communicate on that resource. For example, communication by the access point 106 via LTE using the second RAT radio 112 on a particular unlicensed or shared RF band may be subject to interference from Wi-Fi devices operating on the same unlicensed or shared band. For convenience, LTE on an unlicensed or shared RF band may be referred to herein as LTE/LTE Advanced in unlicensed or shared spectrum, or simply LTE in the surrounding context. Moreover, LTE operating over an unlicensed spectrum may refer to the use or modification of LTE to operate in a contention-based communication system that uses a shared medium.

In some systems, LTE in the unlicensed or shared spectrum may be employed in a standalone configuration, with all carriers operating exclusively in an unlicensed portion of the wireless spectrum (e.g., LTE Standalone). In other systems, LTE in the unlicensed or shared spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user equipment (UE) (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In a blended radio environment such as system 100, different RATs may make use of different channels at different times. Because different RATs may share the spectrum and operate partly independently of others, access to one channel may not imply access to another channel. Accordingly, a device capable of transmitting using a plurality of channels may need to determine whether the plurality of channels are available before transmitting. In order to increase bandwidth and throughput, it may be beneficial in some situations to wait for an additional channel to become available rather than transmitting using a single channel that may be currently available in the first instance.

In an aspect, an access terminal 102 may include a resource manager 130 for determining which time and frequency resources to use for an uplink transmission based on the assignment granted by the access point 106. In some aspects, determining which time and frequency resources to use for an uplink transmission may be determined based on resource block assignments by the access point 106. For example, the access terminal 102 operating in an unlicensed or shared RF band may be assigned, by the access point 106, an interlace of RBs in which uplink data transmissions may be sent. Accordingly, in order to avoid collisions with other access terminals in a contention based uplink channel, the access terminal 102 may send a channel usage beacon signal (CUBS) following a clear channel assessment (CCA/eCCA), which acts as an indication to the network that access terminal 102 is using the uplink channel on assigned resources In an aspect, the term "component" as used herein may be one of the parts that make up a system, and may be, for example, hardware or software. In some aspects one or more components may be divided into other components. Resource manager 130, for example, may include hardware or means for determining assignments for beacon signals used to reserve the uplink channel. Resource manager 130 may further include a data component 131, a beacon signal component 132, and a CCA component 133. In some aspects, the data component 131 may be configured to receive resource allocation(s) for the data from access point 106, and set the uplink transmission channels accordingly. For example, the access terminal 102 may select one or more uplink transmissions channels for uplink transmission based on the resource allocation(s) received from the access point 106.

Additionally or alternatively, the CCA component 133 may determine an uplink transmission synchronization boundary (or "re-sync" boundary) in response to an uplink grant from the access point 106. In some aspects, the CCA component 133 may determine when to begin uplink transmission based on a successful CCA/eCCA clearance with respect to the re-synch boundary. In some aspects, the re-synch boundary may be determined based on the first uplink (UL) subframe among the plurality of assignments received by the access terminal 102. Additionally or alternatively, the re-synch boundary may be based on the first UL subframe(s) among contiguous assignments received by the access terminal 102. Accordingly, the behavior of the access terminal 102 may be specified by either of the above-identified options, or alternatively based on indication from the access point 106 (e.g., via either radio resource control (RRC) message or physical layer or layer 1 (L1) signaling).

The beacon signal component 132 may determine a resource block (RB) for sending a beacon signal to the access point 106 that acknowledges access on an uplink channel. In particular, the beacon signal may be sent on an RB based on an uplink grant for data transmission as assigned by the access point 106. The beacon signal component 132 may determine the type of beacon signal to send. In particular, a CUBS may occupy all tones of the RB, or may occupy only a subset of the tones as a fractional CUBS (F-CUBS)). For example, for power limited access terminals where 20 physical resource blocks (PRBs) may be assigned to meet RF requirements, the F-CUBS may be transmitted as 20 tones spread over a 20 MHz bandwidth. As another example, for non-power limited access terminals, F-CUBS may be transmitted on 10 tones spread over 10 MHz bandwidth. Thus, F-CUBS may be sent as one tone per RB, and may be centered at each RB. Alternatively, F-CUBS may comprise a subset of tones per RB. The reduced number of tones for F-CUBS may reduce leakage to adjacent RBs. The beacon signal component 132 may be configured to determine which RB is to be used for sending the CUBS/F-CUBS.

An access point 106 may include a resource manager 120 for allocating resources for uplink transmissions by the access terminal 102. Although, the resource manager 120 is shown as a component of LTE radio 112, it should be appreciated by those of ordinary skill in the art that the resource manager 120 may be arranged in the access point 106 as a separate component. In some aspects, any LTE wireless device may include a resource manager 120 or 130.

Resource manager 120 may include hardware or means for determining assignments for uplink data transmissions and for determining assignments for beacon signals used to reserve the uplink channel. Resource manager 120 may include a 121 data component and a beacon signal component 122.

The data component 121 may include hardware or means for determining the RB for the uplink transmission and allocate resource blocks for the uplink transmission. For example, data component 121 may include a receiver (not shown) configured to receive a request from access terminal 102 for access to a shared uplink channel (e.g., a physical uplink shared channel (PUSCH)).

The beacon signal component 122 may include hardware configured to determine an interlace assignment for a beacon signal transmission associated with the data transmission. As an example of interlacing resources on a subframe having 100 resource blocks (RBs), a shared assignment for sending a channel reservation signal interlaced every $10^{th}$ RB, would result in ten signals allocated to 10 RBs spread across the subframe. Such a channel reservation signal assigned to an interlace across the subframe may operate as a bandwidth occupancy channel usage beacon signal (BO-CUBS). As such, the access point 106 may assign a common interlace to all access terminals for sending a channel reservation signal on the uplink transmission.

In addition to autonomously determining subframe, RB and/or symbol for CUBS/F-CUBS transmissions, the resource manager 130 of access terminal 102 may receive the interlace assignment for BO-CUBS from the access point 106 along with an assignment for RBs to send an uplink transmission data. Thus, the beacon signal component 132 may elect to send CUBS on an RB according to the interlace assigned for the BO-CUBS.

Figure 2A:
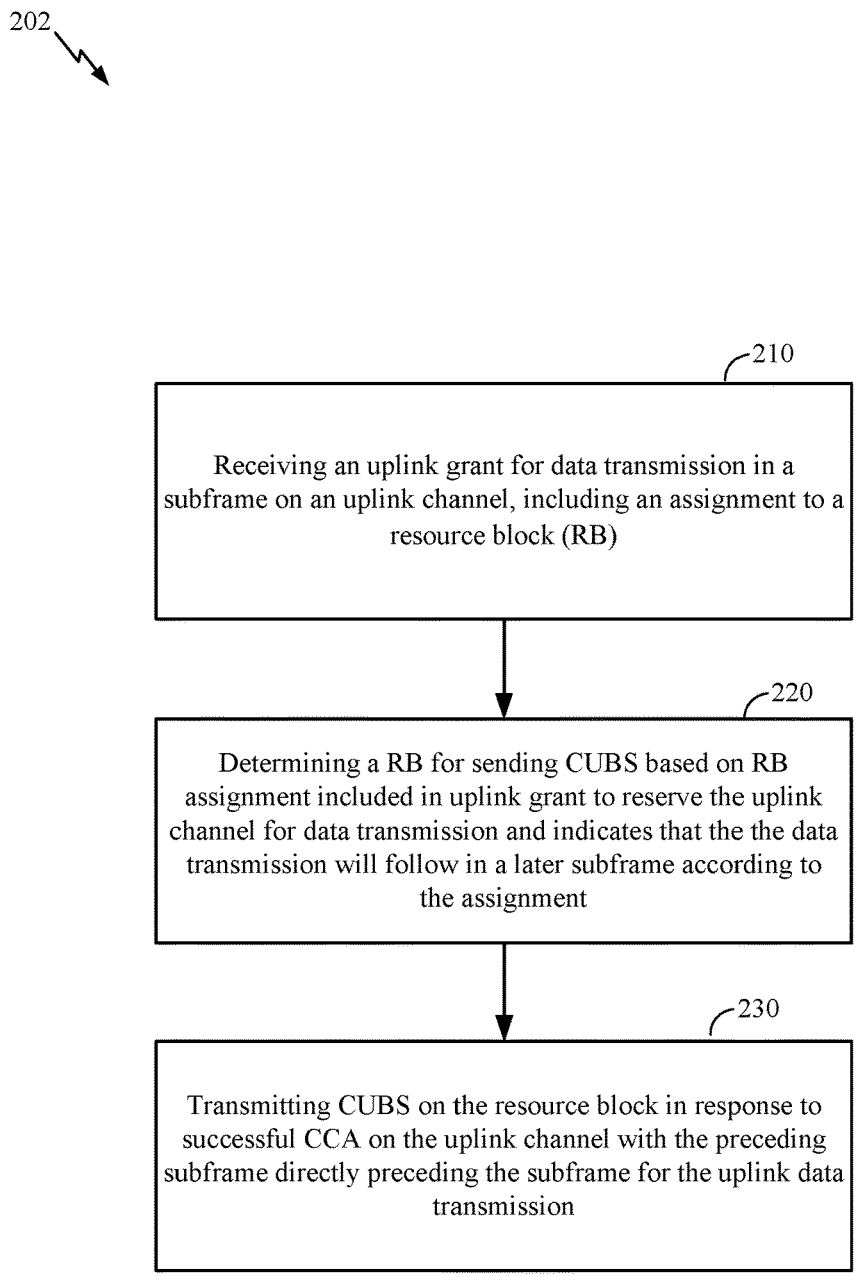
FIG. 2A is a flow diagram illustrating an example method of determining resource blocks channel usage beacon signals in an uplink transmission from the perspective of an access terminal.

FIG. 2A is a flow diagram illustrating an example method 202 of resource allocation for uplink transmission in an unlicensed or shared RF band. The method may be performed by a UE (e.g., the access terminal 102 illustrated in FIG. 1) to determine a time and frequency resource allocation for sending a beacon signal that reserves an uplink channel. At block 210, the method 200 may include receiving an uplink grant from the access point 106. For example, resource manager 130 and/or data component 131 (FIG. 1) may receive an RB interlace assignment for uplink data transmission. As another example, the resource manager 130 and/or beacon signal component 132 may receive a beacon signal assignment (e.g., a BO-CUBS interlace assignment).

At block 220, the method 200 may include determining an RB for sending CUBS based on the RB interlace assignment received in the uplink grant. The CUBS may be used to reserve the uplink channel for the UE according to the assignment. For example, the resource manager 130 and/or beacon signal component 132 may determine when the CUBS should be sent and on what frequency based on the RB assignment.

At block 230, the method 200 may include transmitting CUBS on the RB in response to a successful CCA on the uplink channel. For example, the resource manager 130 and/or CCA component 133 may determine that the CCA timer has cleared, and the beacon signal component 132 may send the CUBS in response to the successful CCA.

Figure 2B:
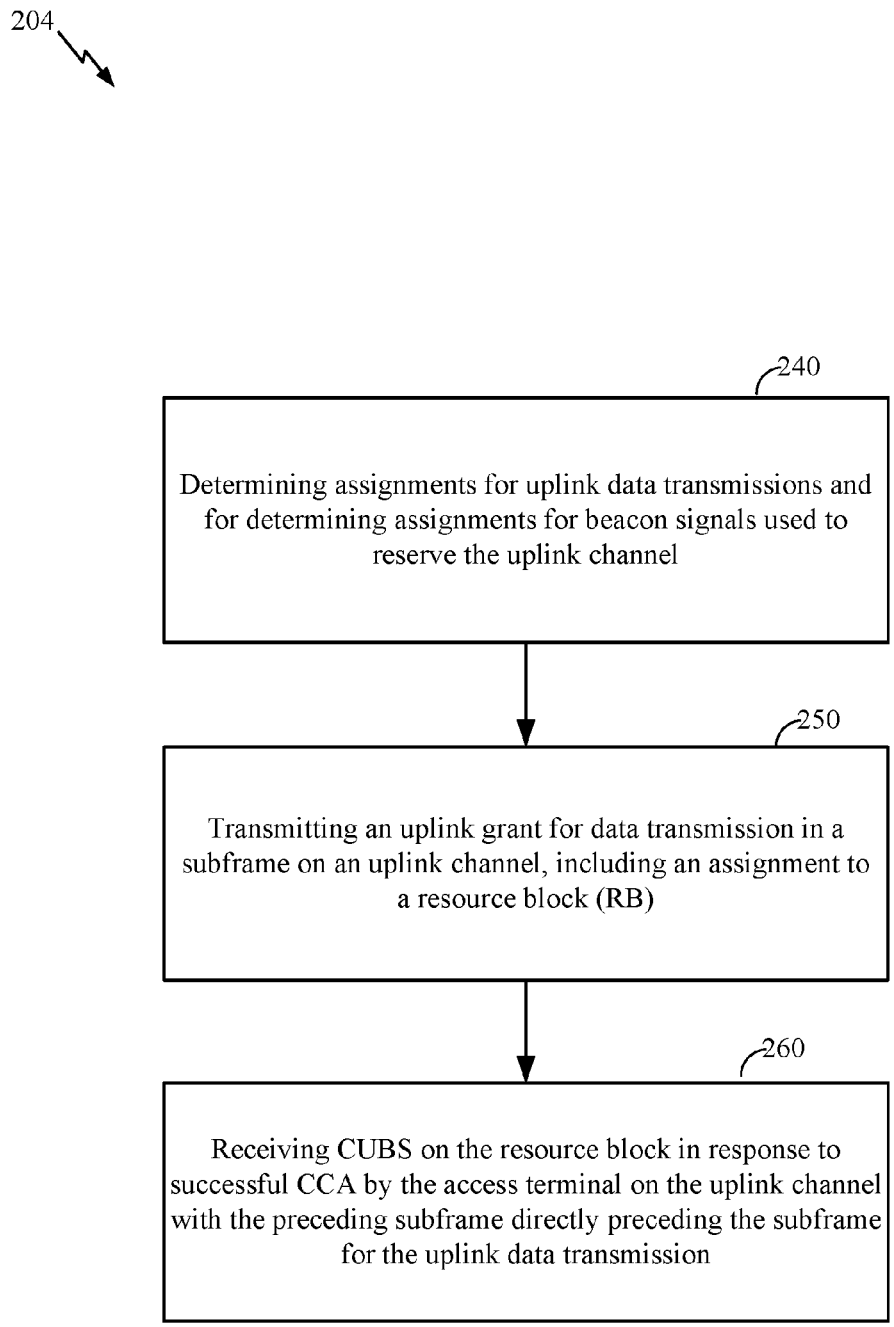
FIG. 2B is a flow diagram illustrating an example method of determining resource blocks channel usage beacon signals in an uplink transmission from the perspective of the access point.

FIG. 2B is a flow diagram illustrating an example method 204 of resource allocation for uplink transmission in an unlicensed or shared RF band. The method may be performed by an access point (e.g., the access point 106 illustrated in FIG. 1) to determine a time and frequency resource allocation for sending a beacon signal that reserves an uplink channel by the UE (e.g., the access terminal 102 illustrated in FIG. 1).

At block 240, the method 204 may include determining assignments for uplink data transmissions and for determining assignments for beacon signals used to reserve the uplink channel. In some aspects, the resource manager 120 may perform the functions of block 240.

At block 250, the method 204 may include transmitting an uplink grant from the access point 106 to the access terminal 102. For example, resource manager 120 may transmit an RB interlace assignment for uplink data transmission to the access terminal. As another example, the resource manager 120 and/or beacon signal component 122 may transmit a beacon signal assignment (e.g., a BO-CUBS interlace assignment).

At block 260, the method 204 may include receiving CUBS on the RB in response to a successful CCA on the uplink channel by the access terminal 102. For example, the resource manager 130 and/or CCA component 133 may determine that the CCA timer has cleared, and the beacon signal component 122 may receive the CUBS following a successful CCA by the access terminal.

FIG. 3A is a diagram illustrating an example radio frame having subframes 0-9, where subframes 0-3 may be dedicated to downlink transmissions, and subframes 5-9 may be dedicated to uplink transmissions. Special subframe S' at location subframe 4 and/or 9 may be configured to handle an UL/DL switch. In the illustrated example, the UE may receive, from the access point, an UL grant at subframe 1 with a RB interlace assignment of interlace 0 for the UL subframes 5-8. Later in subframe 3, the UE may receive a subsequent UL grant, assigning RB interlace 1 at subframes 7-8. Accordingly, as the UE performs CCA, the resource manager 130 may determine which RB interlace assignment to use for determining the CUBS transmission, as will be described in greater detail below.

FIG. 3B shows a diagram of an example CUBS transmission within a subframe. In this example, the CUBS occupies one OFDM symbol within the subframe (e.g., $\frac{1}{14}$ of 1 ms for a 1 ms subframe defined by 14 symbols). Also, in this example, the CUBS is sent in the last symbol of the subframe, just before an UL subframe boundary. If the first UL grant assignment is used, then the CUBS occupies all RBs on interlace 0. For example, the eCCA clearance may occur during subframe 5, and based on the UL grant, the beacon signal component may send the CUBS on RB interlace 0. As another example, if the eCCA clearance shown in FIG. 3B occurs in subframe 7, then the beacon signal component 132 may elect to use the subsequent assignment of RB interlace 1 for sending the CUBS. Therefore, in some aspects, in order to avoid the CUBS/F-CUBS interference from first UE affecting the transmission from a second UE, the first UE may send CUBS/F-CUBS in a UL subframe that uses the RBs corresponding to the UL assignment in the subframe. In some aspects, the UL assignment can be the UL grant for UL data transmission or the UL resource allocated for UE to transmit CUBS/F-CUBS. However, if the first UE does not have an UL assignment in the subframe, it may use RBs corresponding to the UL assignment in the subsequent subframe to transmit CUBS/F-CUBS.

In an aspect of the disclosure to determine an uplink transmission synchronization boundary, the CCA component 133 may select the first UL subframe among all assignments received by the UE. For example, if the CCA/eCCA clearance occurs at subframe 4, then the CCA component 133 may set the uplink transmission synchronization boundary (or "re-sync" boundary) based on subframe 5, where the subframe 5 is the first subframe of both the first UL grant and the subsequent UL grant. The exact uplink transmission synchronization boundary can be one or more symbols prior to the beginning of subframe 5.

In another aspect of the disclosure, the CCA component 133 may elect to determine uplink transmission synchronization boundary based on every first UL subframe that follows a transmission gap (i.e., one or more symbols prior to every first UL subframe that follows a transmission gap).

The beacon signal component 132 may transmit the CUBS immediately on a condition that a successful CCA/eCCA clearance occurs at a subframe symbol after the uplink transmission synchronization boundary. Alternatively, the beacon signal component 132 may defer transmission of CUBS until after the uplink transmission synchronization boundary on a condition that a successful CCA/eCCA occurs at a subframe symbol prior to the uplink transmission synchronization boundary.

Figure 4:
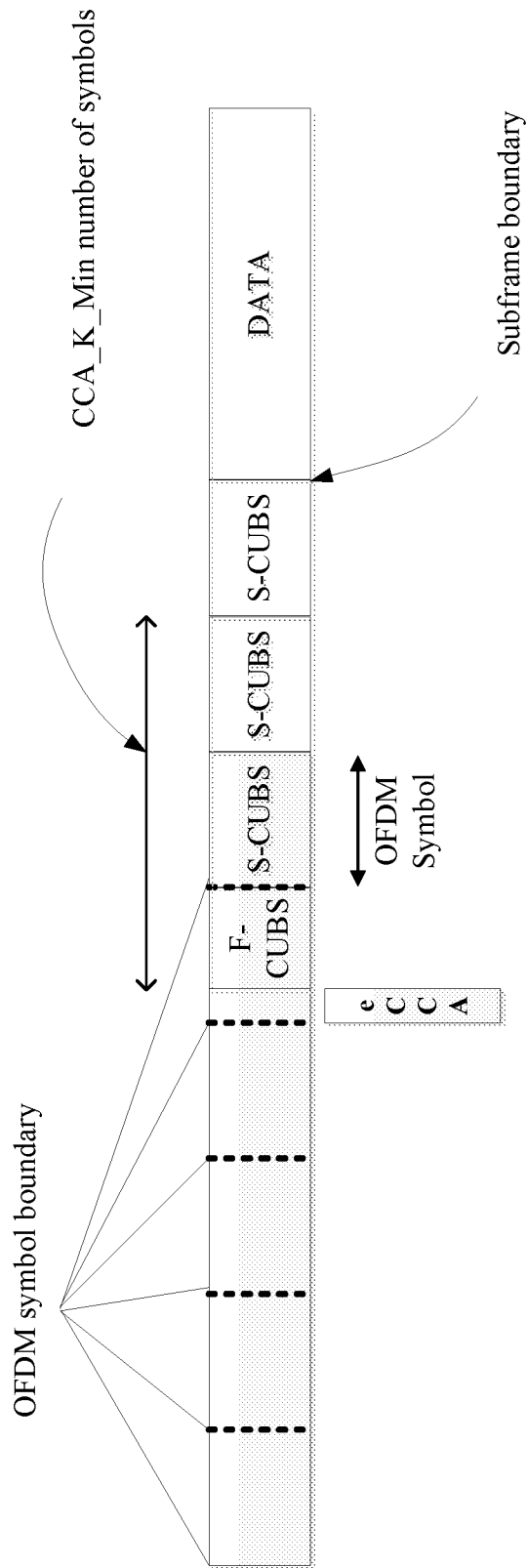
FIG. 4 is a diagram illustrating an example assignment of a fractional CUBS.

FIG. 4 illustrates an assignment of an F-CUBS immediately following the CCA/eCCA clearance. In this example, the uplink transmission synchronization by the CCA component 133 may not performed, and the CCA/eCCA duration and symbol duration are not aligned. Instead of waiting for a symbol boundary to transmit a CUBS following an uplink transmission synchronization, the beacon signal component 132 may determine the type of CUBS to be an F-CUBS having a fractional symbol duration, and occupying a subset of the RBs assigned to the access terminal 102 to minimize potential interference with other access terminals. To realign the subsequent CUBS with symbol boundaries, a symbol CUBS (S-CUBS) having a duration of one full symbol may be selected for subsequent CUBS transmissions in the remaining symbols prior to the next subframe boundary. The transmission of S-CUBS across the multiple symbols prevents the access terminal 102 from losing access to the uplink channel. The beacon signal component 132 determines the F-CUBS as an S-CUBS truncated in time domain depending on how much time duration remains within a symbol upon CCA/eCCA clearance.

Figure 5:
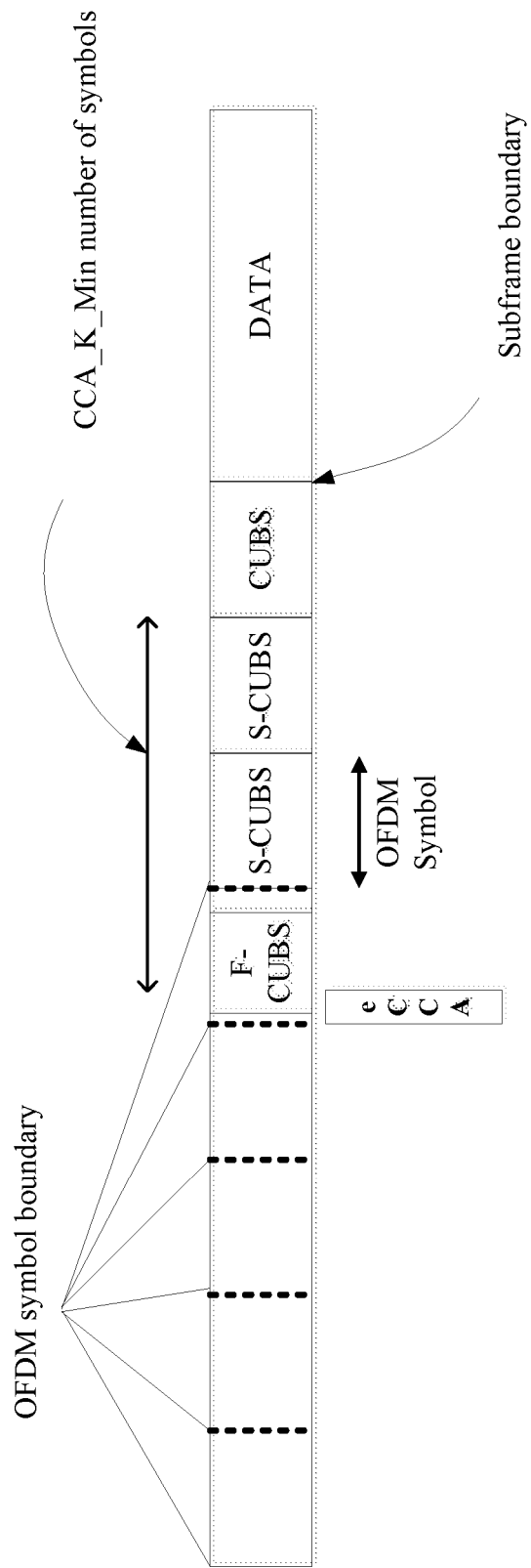
FIG. 5 is a diagram illustrating an example assignment of a fractional CUBS combined with a CUBS.

FIG. 5 illustrates a variation of the example F-CUBS transmission shown in FIG. 4. Here, a CUBS transmission is sent in the last subframe symbol instead of an S-CUBS. After sending F-CUBS, the beacon signal component 132 may determine that a CUBS is to be sent in the last subframe symbol. To perform a waveform switch between F-CUBS and CUBS requires CCA_k_min number of symbols to allow enough time for the transition. The beacon signal component 132 transmits S-CUBS in the CCA_k_min symbols to maintain the same sequence as F-CUBS.

Figure 6:
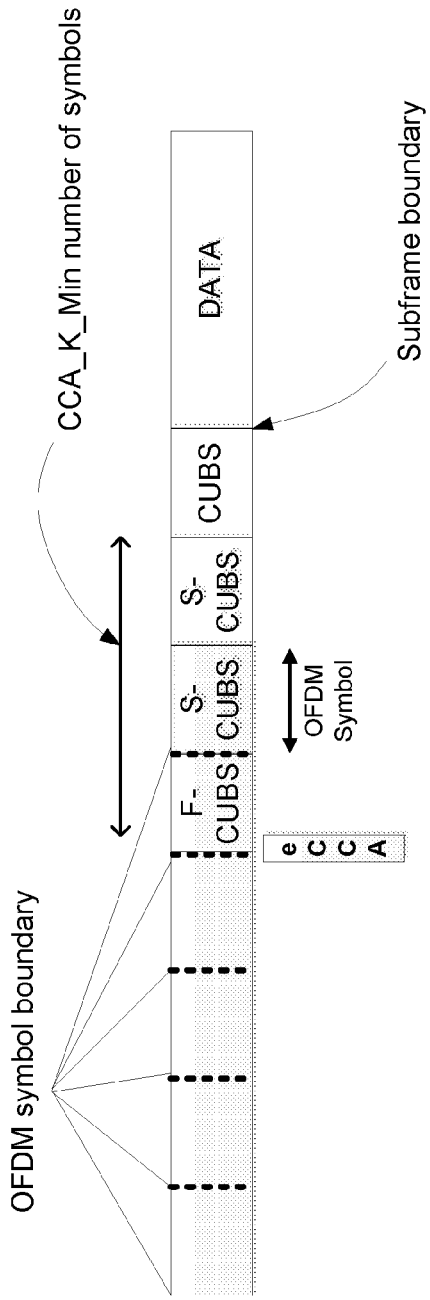
FIGS. 6 and 7 illustrate an example of a dynamic assignment of fractional CUBS combined with CUBS.
Figure 7:
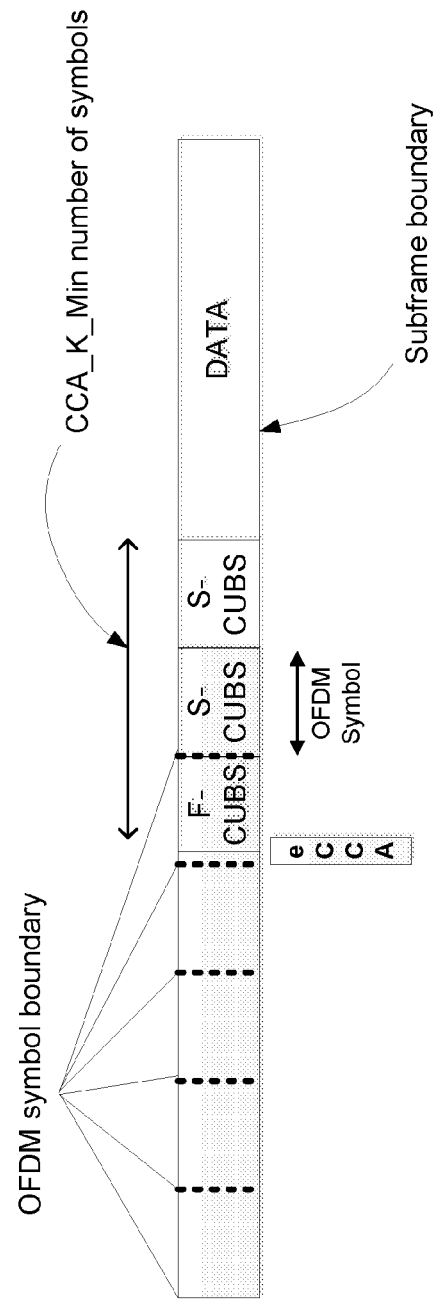

FIGS. 6 and 7 illustrate an example of the beacon signal component 132 dynamically determining between the option of sending the CUBS in the last symbol or scheduling the F-CUBS and S-CUBS to satisfy CCA_K_Min number of symbols. In this example, the beacon signal component 132 may elect to send CUBS after F-CUBS/S-CUBS if there is at least one full symbol remaining before UE needs to transmit UL data in subsequent subframe, as shown in FIG. 6. If there is not at least one available symbol remaining in the subframe after CCA_k_min symbols, then the beacon signal component 132 determines that a CUBS will not be sent, and allocates F-CUBS/S-CUBS in the symbols preceding the subframe boundary, at which time the scheduled uplink data transmission begins, as shown in FIG. 7.

Figure 8:
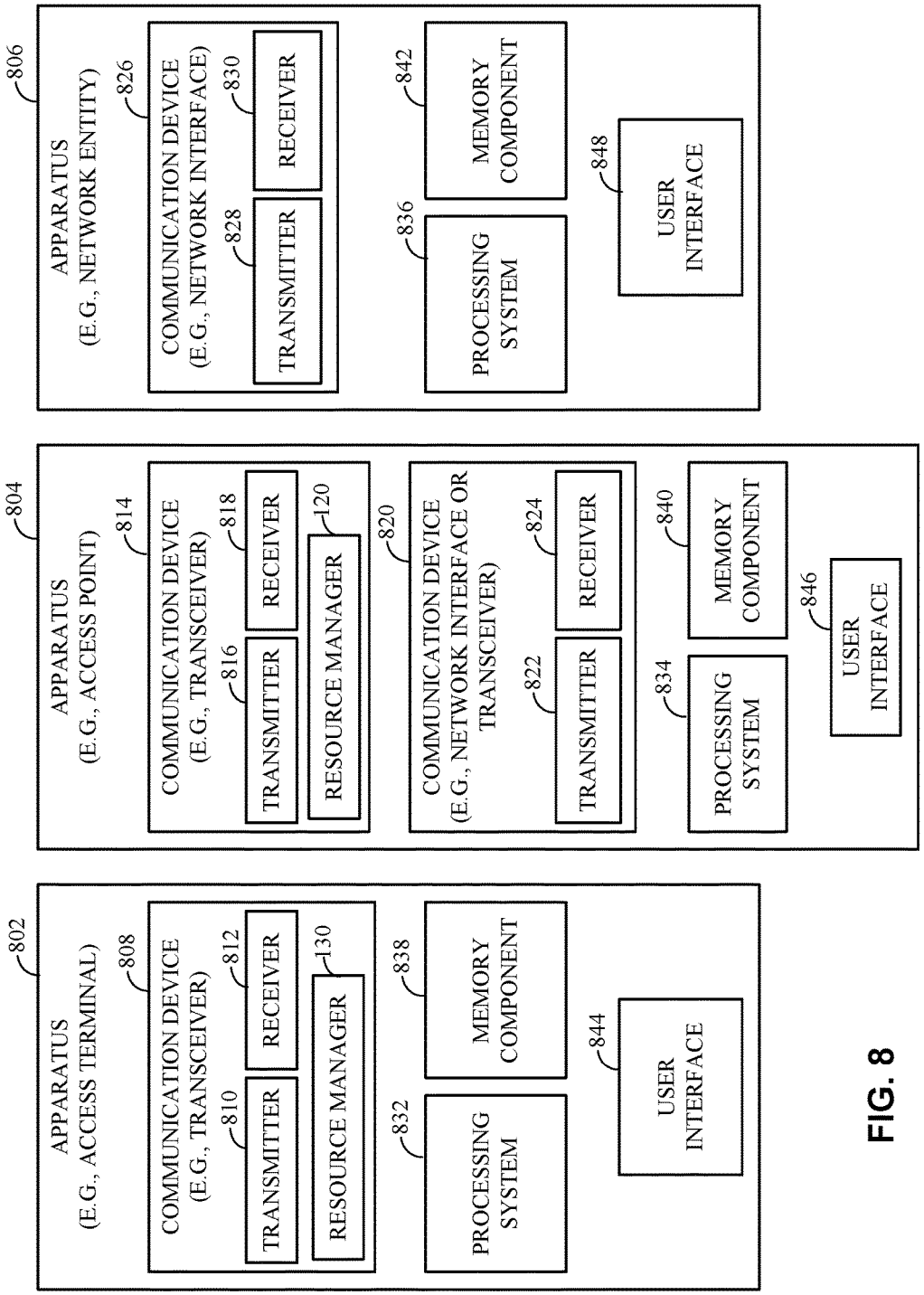
FIG. 8 is a simplified block diagram of several sample aspects of components that may be employed in communication nodes.

FIG. 8 illustrates several examples of components (represented by corresponding blocks) that may be incorporated into an apparatus 802, an apparatus 804, and an apparatus 806 (e.g., corresponding to an access terminal, an access point, and a network entity, respectively) to support techniques for bandwidth occupancy for transmission in unlicensed spectrum as taught herein. The apparatus 802 and the apparatus 804, for example, may include a resource manager 120 and 130 respectively for determining which resource blocks to use for uplink transmission of data and beacon signals. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814 (and the communication device 820 if the apparatus 804 is a relay)) for communicating with other nodes via at least one designated radio access technology. Each communication device 808 includes at least one transmitter (represented by the transmitter 810) for transmitting and encoding signals (e.g., messages, indications, information, and so on) and at least one receiver (represented by the receiver 812) for receiving and decoding signals (e.g., messages, indications, information, pilots, and so on). Similarly, each communication device 814 includes at least one transmitter (represented by the transmitter 816) for transmitting signals (e.g., messages, indications, information, pilots, and so on) and at least one receiver (represented by the receiver 818) for receiving signals (e.g., messages, indications, information, and so on). Additionally, each of the communication devices 808 and 814 may include a resource manager 120, 130 for determining whether to wait for additional channel(s) to become available for a transmission. If the apparatus 804 is a relay access point, each communication device 820 may include at least one transmitter (represented by the transmitter 822) for transmitting signals (e.g., messages, indications, information, pilots, and so on) and at least one receiver (represented by the receiver 824) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 804 comprises a network listen module.

The apparatus 806 (and the apparatus 804 if it is not a relay access point) includes at least one communication device (represented by the communication device 826 and, optionally, 820) for communicating with other nodes. For example, the communication device 826 may comprise a network interface that is configured to communicate with one or more network entities via a wire-based or wireless backhaul. In some aspects, the communication device 826 may be implemented as a transceiver configured to support wire-based or wireless signal communication. This communication may involve, for example, sending and receiving: messages, parameters, or other types of information. Accordingly, in the example of FIG. 8, the communication device 826 is shown as comprising a transmitter 828 and a receiver 830. Similarly, if the apparatus 804 is not a relay access point, the communication device 820 may comprise a network interface that is configured to communicate with one or more network entities via a wire-based or wireless backhaul. As with the communication device 826, the communication device 820 is shown as comprising a transmitter 822 and a receiver 824.

The apparatuses 802, 804, and 806 also include other components that may be used in conjunction with bandwidth occupancy for transmission in unlicensed spectrum as disclosed herein. The apparatus 802 includes a processing system 832 for providing functionality relating to, for example, communicating with an access point to support assignment of resources as taught herein and for providing other processing functionality. The apparatus 804 includes a processing system 834 for providing functionality relating to, for example, resource management as taught herein and for providing other processing functionality. The apparatus 806 includes a processing system 836 for providing functionality relating to, for example, resource management as taught herein and for providing other processing functionality. The apparatuses 802, 804, and 806 include memory devices 838, 840, and 842 (e.g., each including a memory device), respectively, for maintaining information (e.g., information indicative of reserved resources, thresholds, parameters, and so on). In addition, the apparatuses 802, 804, and 806 include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatus 802 is shown in FIG. 8 as including components that may be used in the various examples described herein. In practice, the illustrated blocks may have different functionality in different aspects.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). Similarly, some or all of the functionality represented by blocks 814, 820, 834, 840, and 846 may be implemented by processor and memory component(s) of the apparatus 804 (e.g., by execution of appropriate code and/or by appropriate configuration of processor components). Also, some or all of the functionality represented by blocks 826, 836, 842, and 848 may be implemented by processor and memory component(s) of the apparatus 806 (e.g., by execution of appropriate code and/or by appropriate configuration of processor components).

Some of the access points referred to herein may comprise low-power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
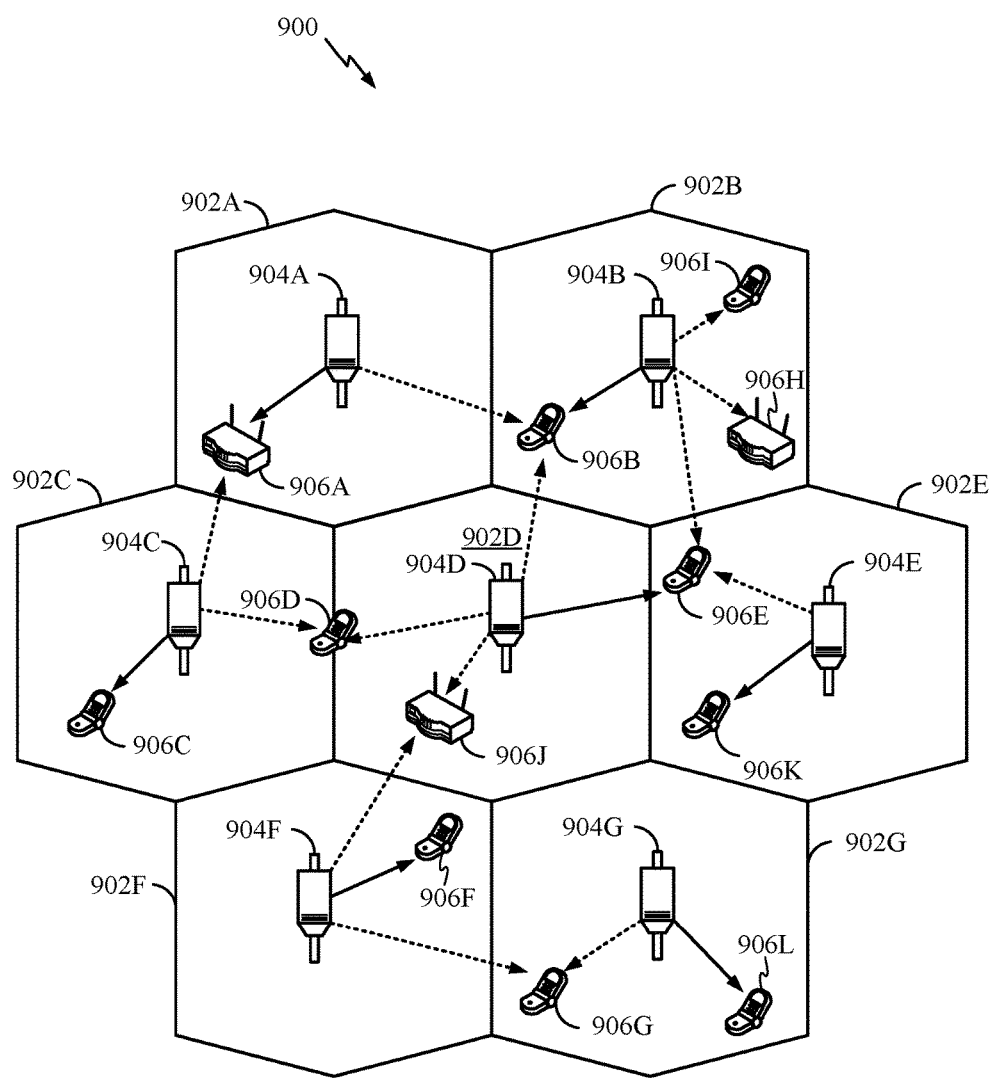
FIG. 9 is a simplified diagram of a wireless communication system.

FIG. 9 illustrates a wireless communication system 900, configured to support a number of users, in which the teachings herein may be implemented. For example, the access points 904 and the access terminals 906 may include a resource manager 120 and a resource manager 130 respectively (see e.g., FIG. 1). Resource manager 120 may include hardware or means for determining assignments for uplink data transmissions and for determining assignments for beacon signals used to reserve the uplink channel. Resource manager 130 may include hardware or means for determining assignments for beacon signals used to reserve the uplink channel. The access terminals 906 and/or the access points 904 may implement the method 200 illustrated in FIG. 2. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in a rural environment.

Figure 10:
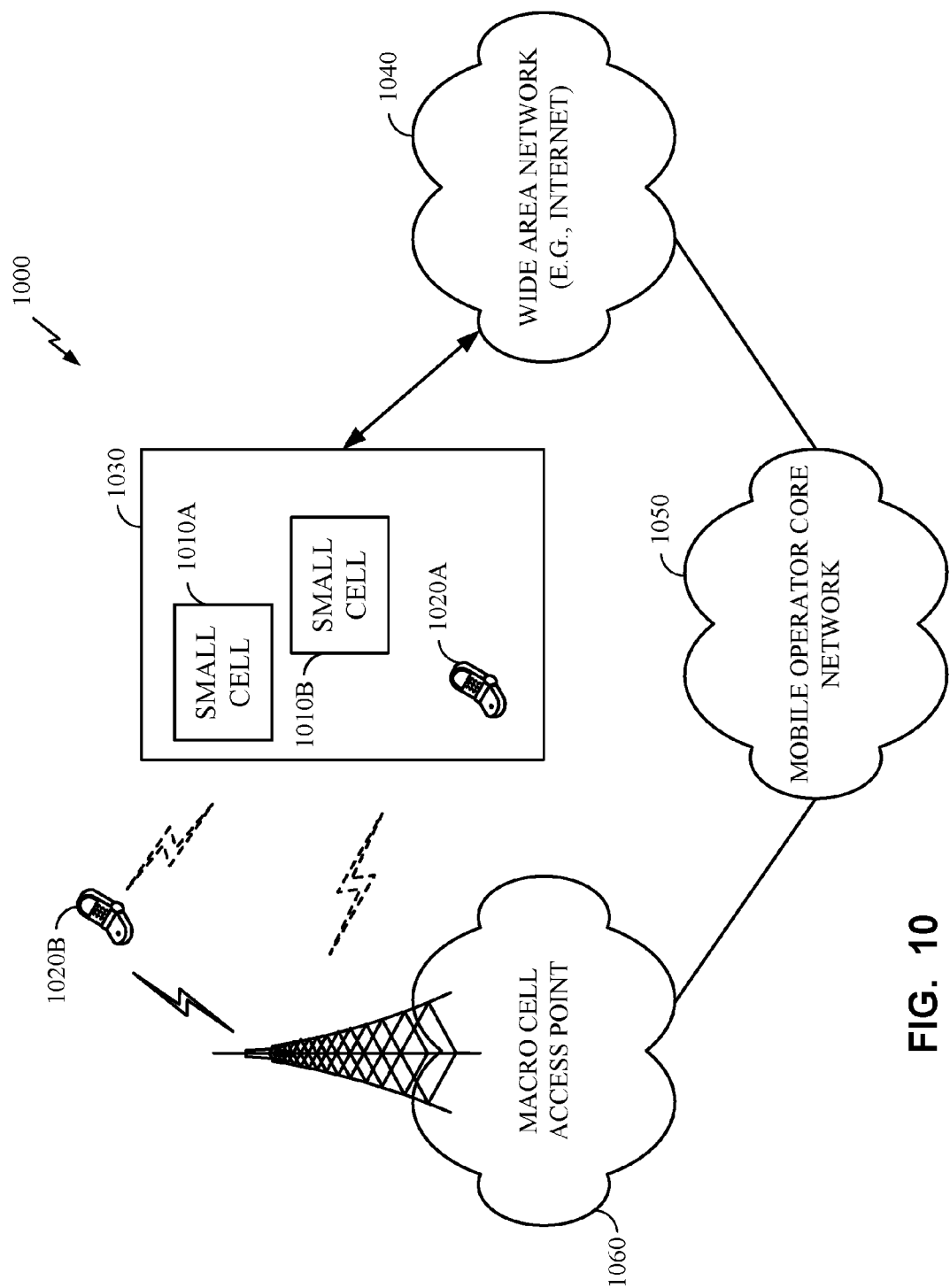
FIG. 10 is a simplified diagram of a wireless communication system including small cells.

FIG. 10 illustrates an example of a communication system 1000 where one or more small cells are deployed within a network environment. The communication system 1000 may include one or more network devices. For example, the small cells 1010 and access terminals 1020 may be network devices including a resource manager 120 for determining channels to use for transmissions. A small cell 1010 and/or an access terminal 1020 may implement the method 200 illustrated in FIG. 2. Specifically, the system 1000 includes multiple small cells 1010 (e.g., small cells 1010A and 1010B) installed in a relatively small scale network environment (e.g., in one or more user residences 1030). Each small cell 1010 may be coupled to a wide area network 1040 (e.g., the Internet) and a mobile operator core network 1050 via a DSL router, a cable modem, a wireless link, or other connectivity means (not shown). As will be discussed below, each small cell 1010 may be configured to serve associated access terminals 1020 (e.g., access terminal 1020A) and, optionally, other (e.g., hybrid or alien) access terminals 1020 (e.g., access terminal 1020B). In other words, access to small cells 1010 may be restricted whereby a given access terminal 1020 may be served by a set of designated (e.g., home) small cell(s) 1010 but may not be served by any non-designated small cells 1010 (e.g., a neighbor's small cell 1010).

Referring again to FIG. 10, the owner of a small cell 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of small cells 1010 (e.g., the small cells 1010A and 1010B that reside within a corresponding user residence 1030). For example, when a subscriber is outside his home, he is served by a standard macro access point (e.g., access point 1060) and when the subscriber is at home, he is served by a small cell (e.g., small cell 1010A). Here, a small cell 1010 may be backward compatible with legacy access terminals 1020.

A small cell 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060). As discussed above, the small cell 1010 and/or an access terminal 1020 may include a resource manager 120 for selecting one or more frequencies to use for a transmission based, in part, on the usage by macro access point 1060.

In some aspects, an access terminal 1020 may be configured to connect to a preferred small cell (e.g., the home small cell of the access terminal 1020) whenever such connectivity is possible. For example, whenever the access terminal 1020A is within the user's residence 1030, it may be desired that the access terminal 1020A communicate only with the home small cell 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred small cell 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1010, the access terminal 1020 selects the small cell 1010 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1010 that reside within the corresponding user residence 1030). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., emergency-911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
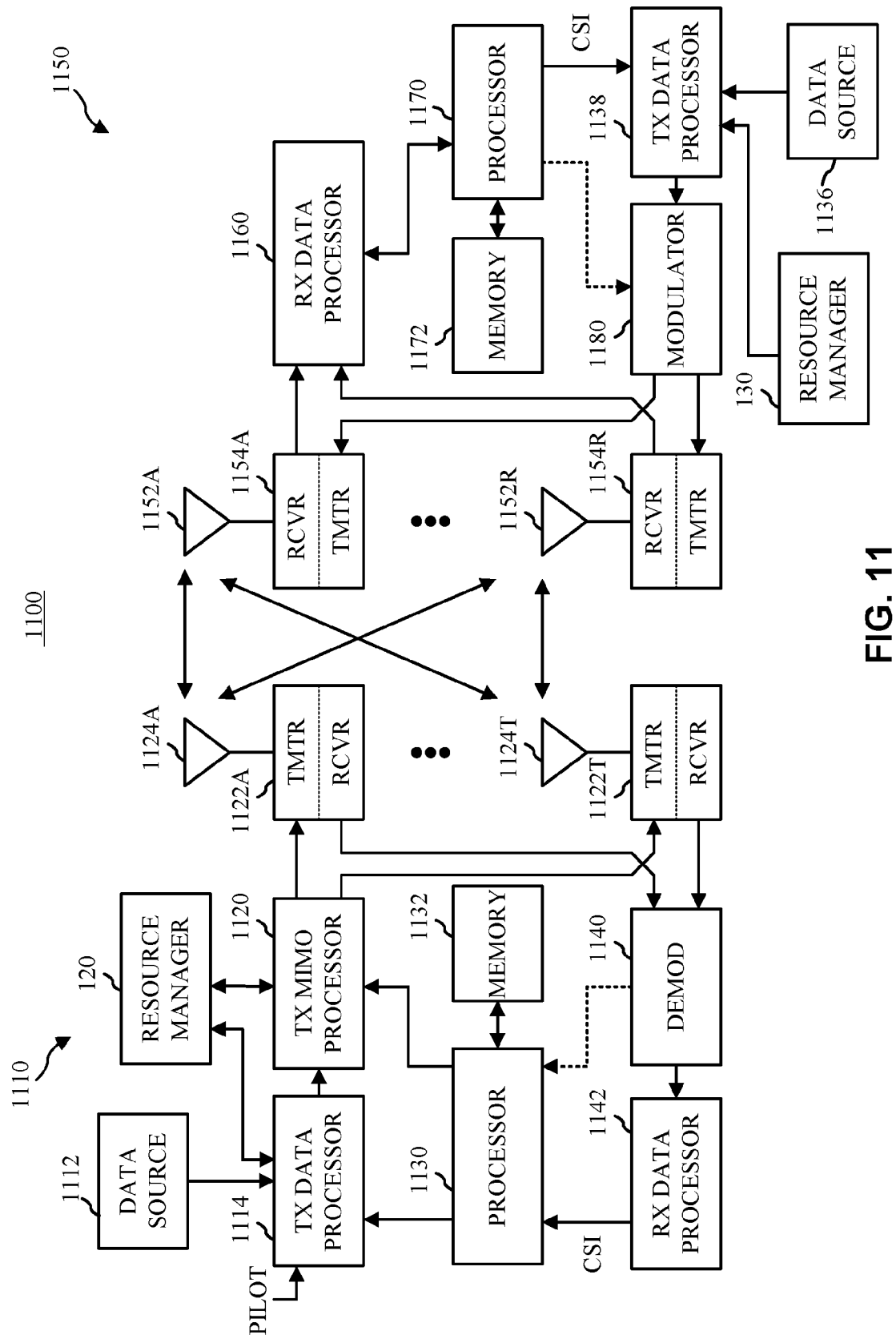
FIG. 11 is a simplified block diagram of several sample aspects of communication components.

FIG. 11 illustrates in more detail the components of a wireless device 1110 (e.g., a small cell AP) and a wireless device 1150 (e.g., a UE) of a sample communication system 1100 that may be adapted as described herein. For example, each of wireless device 1110 and wireless device 1150 may include a resource manager 120, 130 respectively. Resource manager 120 may include hardware or means for determining assignments for uplink data transmissions and for determining assignments for beacon signals used to reserve the uplink channel. Resource manager 130 may include hardware or means for determining assignments for beacon signals used to reserve the uplink channel. Either the wireless device 1110 or the wireless device 1150 may implement the method illustrated in FIG. 2. The resource manager 120 may be a separate component or may be implemented by components such as TX data processor 1114 and TX MIMO processor 1120 of wireless device 1110 or by TX data processor 1138 of device 1150. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides NT modulation symbol streams to NT transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110. The resource manager 120 may determine the channels used by TX data processor 1138.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

It will be appreciated that for each device 1110 and 1150 the functionality of two or more of the described components may be provided by a single component. It will be also be appreciated that the various communication components illustrated in FIG. 11 and described above may be further configured as appropriate to perform bandwidth occupancy for transmission in unlicensed spectrum as taught herein. For example, the processors 1130/1170 may cooperate with the memories 1132/1172 and/or other components of the respective devices 1110/1150 to perform the interlaced resource allocation as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for uplink transmission by a user equipment (UE), comprising:
   receiving an uplink grant for data transmission on an uplink channel, wherein the uplink grant includes a resource block assignment to a resource block from an eNodeB for a channel reservation signal;
   determining the resource block for sending a channel, usage beacon signal (CUBS) over a contention-based spectrum based on the resource block assignment included in the uplink grant, wherein the CUBS reserves the uplink channel for the data transmission and indicates that the data transmission will follow in a subsequent subframe according to the resource block assignment; and
   transmitting, in response to a successful clear channel assessment on the uplink channel, the CUBS in the subframe that directly precedes the subsequent subframe on which the data transmission follows, wherein transmitting the CUBS comprises transmitting a fractional CUBS (F-CUBS) having a fractional symbol duration on only a subset of all available tones of the resource block;
   wherein
      the resource block is determined based on the resource block assignment for the channel reservation signal on a condition that the subframe is not a special subframe used for transition from a set of downlink subframes to a set of uplink subframes; and
      the resource block is determined based on the resource block assignment received in the uplink grant on a condition that the subframe is the special subframe.

2. The method of claim 1, further comprising:
   detecting a second uplink grant that includes a second resource block assignment to a second resource block in the subframe; wherein
   the second resource block is determined based on the second resource block assignment included in the second uplink grant.

3. The method of claim 1, further comprising:
   monitoring for a second uplink grant with a second resource block assignment to a second resource block in the subframe;
   wherein
   the second resource block is determined based on the second resource block assignment received in the second uplink grant, and
   the second resource block is determined based on the second resource block assignment for the channel reservation signal on a condition that a second uplink grant is not received.

4. The method of claim 3, wherein
   the second resource block assignment for the channel reservation signal is shared with other UEs.

5. The method of claim 1, wherein
   the resource block assignment for the channel reservation signal is shared with other UEs.

6. The method of claim 1, wherein the CUBS is transmitted unaligned with a symbol boundary in the subframe responsive to receiving the clear channel assessment at a time unaligned with the symbol boundary.

7. The method of claim 1, further comprising transmitting a plurality of additional CUBS to occupy all symbols between a symbol at the time of receiving the clear channel assessment and a next subframe boundary.

8. The method of claim 7, wherein the plurality of additional CUBS includes at least one CUBS assigned to the subset of tones and at least one CUBS assigned to all tones of a resource block interlace.

9. The method of claim 1, further comprising determining an uplink transmission synchronization boundary based on a first uplink subframe among all RB assignments received by the UE.

10. The method of claim 1, further comprising determining an uplink transmission synchronization boundary based on every first uplink subframe following one or more uplink subframes not having an RB assignment.

11. A user equipment (UE), comprising:
    a processor;
    a memory coupled to the processor, the memory including instructions executable by the processor to:
       receive an uplink grant for data transmission on an uplink channel, wherein the uplink grant includes a resource block assignment to a resource block from an eNodeB for a channel reservation signal; and
       determine the resource block for sending a channel usage beacon signal (CUBS) over a contention-based spectrum based on the resource block assignment included in the uplink grant, wherein the CUBS reserves the uplink channel for the data transmission by indicating that the UE is sending the data transmission in a subsequent subframe according to the resource block assignment; and
    a transmitter configured to transmit, in response to a successful clear channel assessment on the uplink channel, the CUBS in the subframe that directly precedes the subsequent subframe on which the data transmission follows, wherein transmitting the CUBS comprises transmitting a fractional CUBS (F-CUBS) having a fractional symbol duration on only a subset of all available tones of the resource block;
wherein
the resource block is determined based on the resource block assignment for the channel reservation signal on a condition that the subframe is not a special subframe used for transition from a set of downlink subframes to a set of uplink subframes; and
the resource block is determined based on the resource block assignment received in the uplink grant on a condition that the subframe is the special subframe.

12. The apparatus of claim 11, wherein the instructions are further executable by the processor to:
detect a second uplink grant that includes a second resource block assignment to a second resource block in the subframe; wherein
determine the second resource block based on the second resource block assignment included in the second uplink grant.

13. The apparatus of claim 11, wherein the instructions are further executable by the processor to:
monitor for a second uplink grant with a second resource block assignment to a second resource block in the subframe;
wherein
the second resource block is determined based on the second resource block assignment received in the second uplink grant, and
the second resource block is determined based on the second resource block assignment for the channel reservation signal on a condition that a second uplink grant is not received.

14. The apparatus of claim 13, wherein
the second resource block assignment for the channel reservation signal is shared with other UEs.

15. The apparatus of claim 11, wherein
the resource block assignment for the channel reservation signal is shared with other UEs.

16. The apparatus of claim 11, wherein the CUBS is transmitted unaligned with a symbol boundary in the subframe responsive to receiving the clear channel assessment at a time unaligned with the symbol boundary.

17. The apparatus of claim 11, wherein the instructions are further executable by the processor to:
transmit a plurality of additional CUBS to occupy all symbols between a symbol at the time of receiving the clear channel assessment and a next subframe boundary.

18. The apparatus of claim 17, wherein the plurality of additional CUBS includes at least one CUBS assigned to the subset of tones and at least one CUBS assigned to all tones of a resource block interlace.

19. The apparatus of claim 11, wherein the instructions are further executable by the processor to:
determine an uplink transmission synchronization boundary based on a first uplink subframe among all RB assignments received by the UE.

20. The apparatus of claim 11, wherein the instructions are further executable by the processor to:
determine an uplink transmission synchronization boundary based on every first uplink subframe following one or more uplink subframes not having an RB assignment.

21. An apparatus for uplink transmission by a user equipment (UE), comprising:
means for receiving an uplink grant for data transmission on an uplink channel, wherein the uplink grant includes a resource block assignment to a resource block from an eNodeB for a channel reservation signal;
means for determining the resource block for sending a channel usage beacon signal (CUBS) over a contention-based spectrum based on the resource block assignment included in the uplink grant, wherein the CUBS reserves the uplink channel for the data transmission by indicating that the UE is sending the data transmission in a subsequent subframe according to the resource block assignment; and
means for transmitting, in response to a successful clear channel assessment on, the uplink channel, the CUBS in, the subframe that directly precedes the subsequent subframe for on which the data transmission follows, wherein transmitting the CUBS comprises transmitting a fractional CUBS (F-CUBS) having a fractional symbol duration on only a subset of all available tones of the resource block;
wherein
the resource block is determined based on the resource block assignment for the channel reservation signal on a condition that the subframe is not a special subframe used for transition from a set of downlink subframes to a set of uplink subframes; and,
the resource block is determined based on the resource block assignment received in the uplink grant on a condition that the subframe is the special subframe.

22. A computer-readable medium for allocating resources for an uplink transmission, comprising instructions executable by a processor for:
receiving an uplink grant for data transmission on an uplink channel, wherein the uplink grant includes a resource block assignment to a resource block from an eNodeB for a channel reservation signal;
determining the resource block for sending a channel usage beacon signal (CUBS) over a contention-based spectrum based on the resource block assignment included in the uplink grant, wherein the CUBS reserves the uplink channel for the data transmission by indicating that the UE is sending the data transmission in a subsequent subframe according to the resource block assignment; and
transmitting, in response to a successful clear channel assessment on the uplink channel, the CUBS in the subframe that directly precedes the subsequent subframe on which the data transmission follows, wherein transmitting the CUBS comprises transmitting a fractional CUBS (F-CUBS) having a fractional symbol duration on only a subset of all available tones of the resource block;
wherein
the resource block is determined based on the resource block assignment for the channel reservation signal on a condition that the subframe is not a special subframe used for transition from a set of downlink subframes to a set of uplink subframes; and
the resource block is determined based on the resource block assignment received in the uplink grant on a condition that the subframe is the special subframe.

23. The computer-readable medium of claim 22, further comprises instructions executable by a processor for:
detecting a second uplink grant that includes a second resource block assignment to a second resource block in the subframe; wherein
the second resource block is determined based on the second resource block assignment included in the second uplink grant.

24. The computer-readable medium of claim 22, further comprises instructions executable by a processor for:
monitoring for a second uplink grant with a second resource block assignment to a second resource block in the subframe;
wherein
the second resource block is determined based on the second resource block assignment received in the second uplink grant, and
the second resource block is determined based on the second resource block assignment for the channel reservation signal on a condition that a second uplink grant is not received.

25. The computer-readable medium of claim 24, wherein the second resource block assignment for the channel reservation signal is, shared with other UEs.

26. The computer-readable medium of claim 22, wherein the resource block assignment for the channel reservation signal is shared with other UEs.

27. The computer-readable medium of claim 22, wherein the CUBS is transmitted unaligned with a symbol boundary in the subframe responsive to receiving the clear channel assessment at a time unaligned with the symbol boundary.

28. The computer-readable medium of claim 22, further comprises instructions executable by a processor for:
transmitting a plurality of additional CUBS to occupy all symbols between a symbol at the time of receiving the clear channel assessment and a next subframe boundary.

29. The computer-readable medium of claim 22, wherein the plurality of additional CUBS includes at least one CUBS assigned to the subset of tones and at least one CUBS assigned to all tones of a resource block interlace.

30. The computer-readable medium of claim 22, further comprises instructions executable by a processor for:
determining an uplink transmission synchronization boundary based on a first uplink subframe among all RB assignments received by the UE.

* * * * *